US006799962B2

(12) United States Patent
Mai et al.

(10) Patent No.: US 6,799,962 B2
(45) Date of Patent: Oct. 5, 2004

(54) STRIPPER ASSEMBLY

(75) Inventors: Arnold Mai, Irrel (DE); Philippe Jean Alphonse Seyler, Luxembourg (LU)

(73) Assignee: Husky Injection Molding Systems Ltd. (CA)

( * ) Notice: Subject to any disclaimer, the term of this patent is extended or adjusted under 35 U.S.C. 154(b) by 54 days.

(21) Appl. No.: 09/994,776

(22) Filed: Nov. 28, 2001

(65) Prior Publication Data

US 2002/0146483 A1 Oct. 10, 2002

(Under 37 CFR 1.47)

(30) Foreign Application Priority Data

Apr. 9, 2001 (LU) ................................. 90 756

(51) Int. Cl.$^7$ ............................................. B29C 45/42
(52) U.S. Cl. ...................................... 425/556; 425/537
(58) Field of Search ................................ 425/533, 537, 425/556, DIG. 5

(56) References Cited

U.S. PATENT DOCUMENTS

| 3,685,943 A | * | 8/1972 | Fischer | 425/533 |
|---|---|---|---|---|
| 3,887,316 A | * | 6/1975 | Hestehave | 425/525 |
| 4,140,464 A | | 2/1979 | Spurr et al. | 425/533 |
| 4,150,088 A | | 4/1979 | Chang et al. | 264/328 |
| 4,299,371 A | | 11/1981 | Duga | 249/68 |
| 4,310,282 A | | 1/1982 | Spurr et al. | 414/753 |
| 4,412,806 A | | 11/1983 | Gaiser et al. | 425/554 |
| 4,497,624 A | | 2/1985 | Brun et al. | 425/548 |
| 4,521,177 A | | 6/1985 | Blank et al. | 425/533 |
| 4,571,171 A | | 2/1986 | Blank et al. | 425/533 |
| 4,634,366 A | | 1/1987 | Brun et al. | 425/526 |
| 4,950,152 A | | 8/1990 | Brun, Jr. et al. | 425/533 |
| 5,653,934 A | * | 8/1997 | Brun, Jr. et al. | 264/334 |
| 6,450,797 B1 | | 9/2002 | Joseph | 425/556 |
| 6,461,141 B1 | * | 10/2002 | Harrison et al. | 425/556 |
| 2003/0094733 A1 | * | 5/2003 | Knepper et al. | 264/334 |

FOREIGN PATENT DOCUMENTS

EP 0 718 084 6/1996 ........... B29C/45/42

* cited by examiner

Primary Examiner—W. L. Walker
Assistant Examiner—Emmanuel Luk
(74) Attorney, Agent, or Firm—Katten, Muchin, Zavis, Rosenman

(57) ABSTRACT

Stripper assembly for an injection molding machine comprising at least one slide pair having a first slide and a second slide and actuation means operatively coupled to said first slide for moving the first slide in a first direction. According to an important aspect of the invention, the stripper assembly further comprises transmission means operatively coupled to said first slide and said second slide for transforming the movement of the first slide in the first direction in a movement of the second slide in a second direction, the second direction being opposite to the first direction.

8 Claims, 5 Drawing Sheets

STRIPPER ASSEMBLY

BACKGROUND OF THE INVENTION

1. Field of the Invention

The present invention relates to a stripper assembly for an injection molding machine.

2. Summary of the Prior Art

Injection molded products are produced in a mold shoe of an injection molding machine. Such a mold shoe comprises an assembly of inserts that cooperate to form a complete mold cavity. A mold shoe of an injection molding machine is normally considered as being made of two halves, namely a hot and a cold half. Typically, the cold half is secured to a moving platen of the injection molding machine, whereas the hot half is secured to a stationary platen. The mold halves are operable between a mold open and a mold closed position by reciprocation of the moving platen. Very broadly speaking, when the mold halves are in their closed position, a mold cavity is formed by a recess in the hot half forming the outside geometry and a core on the cold half forming the inside geometry. The recess and the core generally comprise a number of individual inserts.

After injecting plastic melt into the mold cavity and allowing it to achieve sufficient solidification to withstand part ejection forces without undue deformation, the mold shoe halves are opened. The newly formed products are thereby released from the hot half inserts while still being retained on the cold half inserts. The release of the completed products from the cold half inserts is performed by a stripper assembly mounted on the cold half of the mold shoe. Indeed, the cold half generally comprises a core plate assembly having a subset of the cold half inserts mounted thereon and a stripper assembly for stripping the completed products off the cold half inserts. Such a stripper assembly is connected to actuation means for operating the stripper assembly between a back and a forward position with respect to the core plate assembly. The stripper assembly further comprises at least one slide pair. While operating the stripper assembly between the back and forward position, a release mechanism operates the slides of the slide pairs between an open and a closed position, wherein corresponding slides within a pair diverge and converge respectively while remaining mutually parallel.

The cold half inserts comprise core, neck ring and lock ring inserts. The core and lock ring inserts are secured on a face of the core plate assembly, and corresponding neck ring halves are secured on opposing slides. The neck ring inserts mounted on the slides retain the product on the cold half of the mold shoe as the cold half is separated from the hot half. Once the products have sufficiently cooled, they can be released from the cold half. In order to do so, the stripper assembly is moved from its back to its forward position, thereby pushing the product over the core insert. As the stripper assembly gets close to its forward position, the slides are operated towards their open position by means of the release mechanism. The slides and the neck ring halves mounted thereon diverge and release the completed product Once the parts have been released, the stripper assembly is moved from its forward to its back position and the sides are operated to their closed position by means of the release mechanism.

A typical release mechanism uses cams to establish a defined relationship between the position of the stripper assembly in its stroke relative to the core plate assembly, and the separation position between slides in a corresponding pair.

One typical approach to release mechanism design uses cams that have profiled surfaces that bear directly against compatible slide surfaces, wherein the profile of the cams control the positional relationship of the slides. Such a release mechanism is however not ideal as each slide pair requires its own pair of opening cams.

Another typical approach uses a simplified design of the release mechanism, linking together of all of the slides going in one direction. Such a release mechanism e.g. has the slides opening to the left connected by means of a connecting bar and the slides opening to the right connected by means of another connecting bar. Each linked set includes a cam follower mounted to either a connecting bar or to a slide and comprises a cam follower moveable within a cam to operate the slide pairs between their open and closed positions. The main disadvantage of this release mechanism is an inefficient use of space that results from connecting all of the slides that are to move in the same direction to a common connecting bar. Specifically, practical design considerations dictate that the way the slides and connecting bar are connected cannot be symmetrical about the middle of the mold, and therefore may create spatial restrictions (e.g. interference with a tiebar) in one corner of the mold that are not an issue in another. A further disadvantage is that the two halves of the release mechanism are independent, and hence require separate cams or cam profiles.

Another release mechanism is disclosed in U.S. Pat. No. 4,521,177. This release mechanism comprises a guide plate mounted a core plate assembly. The slides are slideably arranged in the guide plate. A first adjustment bar is arranged between the core plate assembly and a first slide, whereas a second adjustment bar is arranged between the core plate assembly and a second slide. Both adjustment bars run at right angles to the direction of displacement of the slides. They comprise grooves extending at an acute angle to the longitudinal direction of the adjustment bars for receiving thrust pins connected to the slides. The grooves of the two adjustment bars are inclined in opposite directions so as to operate the slides in opposite directions as the adjustment bars are displaced. Both adjustment bars are connected via a yoke to actuation means. The problem with this release mechanism is that due to the high number of elements in the actuator coupling, there is a risk that the slides do not open simultaneously. This can then cause the molded product not to be released properly. Furthermore, due to the adjustment bars, the design of the stripper assembly becomes rather cumbersome.

SUMMARY OF THE INVENTION

The object of the present invention is to provide a stripper assembly, which has a simple release mechanism while at the same time making the stripper assembly more compact.

In order to overcome the abovementioned problems, the present invention proposes a stripper assembly for an injection molding machine comprising at least one slide pair having a first slide and a second slide and actuation means operatively coupled to said first slide for moving the first slide in a first direction. According to an important aspect of the invention, the stripper assembly further comprises transmission means operatively coupled to said first slide and said second slide for transforming the movement of the first slide in the first direction in a movement of the second slide in a second direction, the second direction being opposite to the first direction. The release mechanism of this stripper assembly, i.e. the actuation means and the connection means is a very simple design and it allows for a very compact design of the stripper assembly. Actuating means are provided for the first slide only. The second slide is coupled to the first slide by the transmission means. By using transmission means capable of transforming the movement of the first slide in a first direction in a movement of the second slide in the opposite direction, there is no need to supply actuation means for the second slide. A further advantage is that the movement of both slides is always synchronized. This is because, due to the transmission means, the movement of the second slides depends directly on the movement of the first slide. If the movement of the slides is not synchronized, the molded product may not be released properly, causing a production stoppage in order to avoid damage to any parts.

According to a preferred embodiment, the stripper assembly has a set of slide pairs with at least one first connecting bar for connecting the first slides and at least one second connecting bar for connecting the second slides. By connecting corresponding slides together, several slide pairs can be operated simultaneously by one and the same actuation means. Actuating means are provided for the first connecting bar only. The second connecting bar is coupled to the first connecting bar by the transmission means. By using transmission means capable of transforming the movement of the first connecting bar in a first direction in a movement of the second connecting bar in the opposite direction, there is no need to supply actuation means for the second connecting bar.

According to another preferred embodiment, the stripper assembly has a first set of slide pairs and a second set of slide pairs, wherein each pair comprises at least one first connecting bar for connecting the first slides and at least one second connecting bar for connecting the second slides. Actuating means are provided for each first connecting bar only. The second connecting bars are coupled to the first connecting bars by the transmission means. Due to the transmission means there is no need to supply actuation means for the second connecting bars.

The first slides of the first set and the first slides of the second set are advantageously operated in opposite directions. This is of particular advantage as interference between the tiebars and the connection bars can be greatly reduced. Indeed, with previously known stripper assembly assemblies, the number of slide pairs was limited due to the fact that, as the slide pairs diverged, one of the connecting bars would hit the tiebar. With the stripper assembly according to the invention, this problem is solved in that the connecting bar that would hit the tiebar is replaced by two connecting bars moving in opposite directions. Indeed, the first connecting bars of the first and second set are both moved away from the tiebar. It is hence possible to increase the number of slide pairs on the stripper assembly, and also the number of inserts in the mold shoe within a given tiebar spacing. This then allows an important increase in production volume with a minimum of alterations to the system.

The first and second connecting bars are advantageously connected to the first and second slides at first end portions thereof, and preferably also at second end portions thereof. The release mechanism is thereby confined to the edges of the stripping assembly. The number of products produced per slide pair is hence not reduced by the release mechanism.

The transmission means preferably couple the at least one first connecting bar to the at least one second connecting bar.

According to first embodiment the transmission means comprises a pivoting lever pivotably mounted between the first and second slides, a first end of the pivoting lever being coupled to the first slide and a second end of the pivoting lever being coupled to the second slide. Such a lever provides a very simple means for transmitting movement of the first slide in a first direction to a movement of the second slide in the opposite direction.

According to second embodiment the transmission means comprises a first toothed face coupled to the first slide; a second toothed face coupled to the second slide, the first and second toothed faces facing each other; and a gearwheel engaging the first and second toothed faces. Such a gear mechanism also provides a very simple means for transmitting movement of the first slide in a first direction to a movement of the second slide in the opposite direction.

The actuation means is preferably mounted on the at least one first connecting bar. The actuation means preferably comprises a cam follower connected to the first slide, and a cam in which the cam follower is movable for moving the first slide in the first direction. Such actuation means are of very simple design and allow the release mechanism to be activated by simply operating the stripper assembly between its backward and forward positions. No actuator is needed for operating the release mechanism. This thus also contributes to the compactness of the design. The release mechanism is automatically interlocked with the stripper assembly motion ensuring no risk of misaligned or mistimed slide motion which could cause damage.

The invention also concerns an injection molding machine having a stripper assembly as described hereabove.

BREIF DESCRIPTION OF THE DRAWINGS

The present invention will be more apparent from the following description of a not limiting embodiment with reference to the attached drawings, wherein FIG. 1 is a schematic side view of a mold shoe of an injection molding machine in an open position;

In the figures, the same reference signs indicate similar or identical elements.

DETAILED DESCRIPTION OF THE PREFERRED EMBODIMENTS

Figure 1:
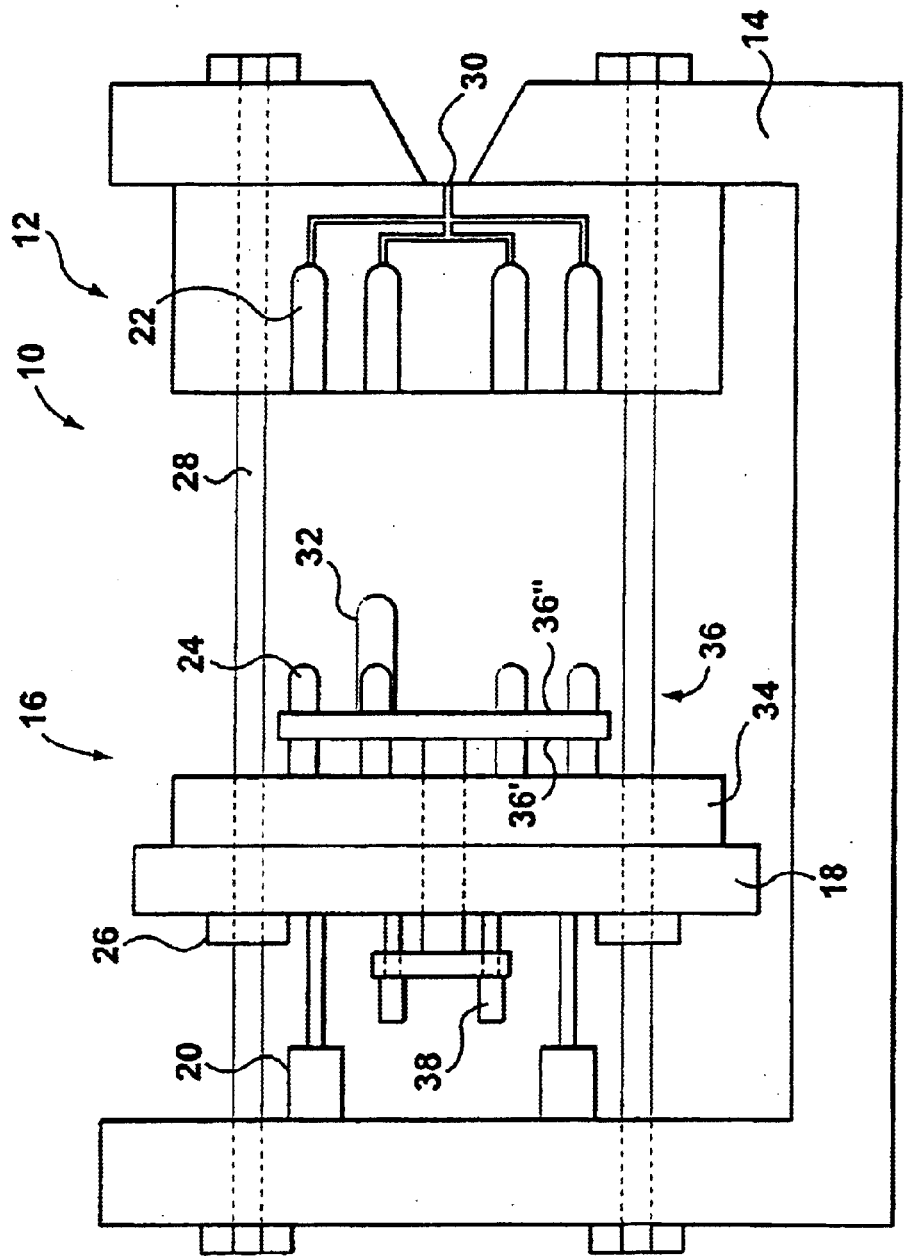

FIG. 1 shows a mold shoe 10 of an injection molding machine, in particular for producing preforms used in the blow molding of bottles. Such a mold shoe 10 generally comprises a hot half 12 mounted on a stationary platen 14 and a cold half 16 secured to a moving platen 18. The mold halves 12, 16 are operable between a mold open and a mold closed position by reciprocation of the moving platen 18. FIG. 1 shows the mold shoe 10 in its open position. The moving platen 18 is actuated by actuating means 20. When the mold shoe 10 is in the mold closed position, a mold cavity is formed by a recess 22 in the hot half 12 and a core 24 on the cold half 16. The cold half 16 is maintained in the closed position by means of clamps 26 on tiebars 28.

The cavities 22 and the core elements 24 form the molds, which can now be filled with material through a melt inlet 30. After at least partial solidification of the injected material, the cold half 16 is moved into an open position, away from the hot half 12, thereby releasing the molded products 32 from the cavities 22. The cold half 16 comprises a core plate assembly 34, on which the core elements 24 are mounted, and a stripper assembly 36 for stripping the molded products 32 off the core elements 24. As the cold half 16 approaches its open position, an actuator 38 actuates the stripper assembly 36 away from the core plate assembly 34 towards the hot half 12. While moving away from the core plate assembly 34, the stripper assembly 36 pushes the molded products 32 away from the core plate assembly 34. Towards the end of its stroke, the stripper assembly 36 releases the molded products 32. The stripper assembly 36 will be more closely described by referring to FIGS. 2 to 5.

Figure 2:
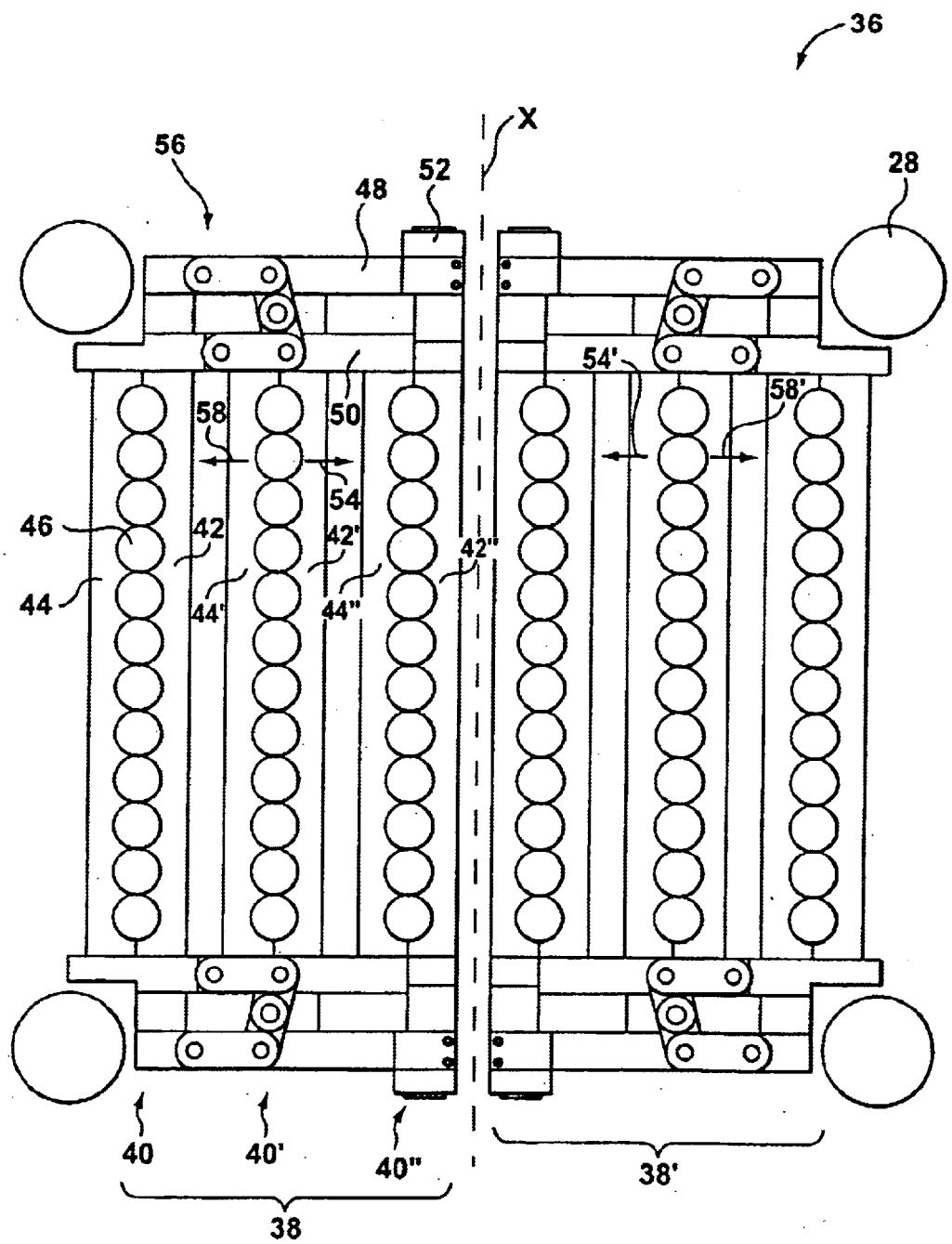
FIG. 2 is a schematic clamp side view of a stripper assembly according to the invention.

FIG. 2 shows the clamp side 36' of a stripper assembly 36 according to the invention, i.e. the side facing the core plate assembly 34. This stripper assembly 36 has two sets 38, 38' of slide pairs 40. The second set 38' is a mirror image of the first set 38 about a central axis X of the stripper assembly 36. The first set 38 comprises three slide pairs 40, 40', 40", each having a first slide 42, 42', 42" and a second slide 44, 44', 44". The first and second slides 42, 44 are formed so as to define openings 46 between them through which the core elements 24 of the core plate assembly 34 can protrude.

The first slides 42, 42', 42" have end portions, which are connected to a first connecting bar 48, thereby rigidly connecting together all of the first slides 42, 42', 42" of the slide pairs 40, 40', 40". Similarly, the second slides 44, 44', 44" have end portions, which are connected to a second connecting bar 50.

A cam follower 52 is connected to the first connecting bar 48 and is moveable in a cam 84 (shown on FIG. 5), which is fixedly attached to the core plate assembly 34. The cam is designed so that, as the stripper assembly 36 approaches the end of its opening stroke, the cam follower 52 moves the first connecting bar 48 and hence the first slides 42, 42', 42" in a first direction as indicated by arrow 54.

A lever assembly 56 is connected between the first connecting bar 48 and the second connecting bar 50 for moving the second connecting bar 50 and the second slides 44, 44', 44" in a second direction, which is opposite to the first direction, as indicated by arrow 58. The lever assembly 56 can be better described by referring to FIG. 3a. The lever assembly 56 comprises a main lever 60 pivotably mounted about a pivoting point 62 between the first and second connecting bars 48, 50. The first end 60' of the main lever 60 is rotatably connected to the first end 64' of a first auxiliary lever 64. The second end 60" of the lever main 60 is rotatably connected to the first end 66' of a second auxiliary lever 66. The second end 64' of the first auxiliary lever 64 is connected to the first connecting bar 48 and the second end 66" of the second auxiliary lever 66 is connected to the second connecting bar 50.

Figure 3A:
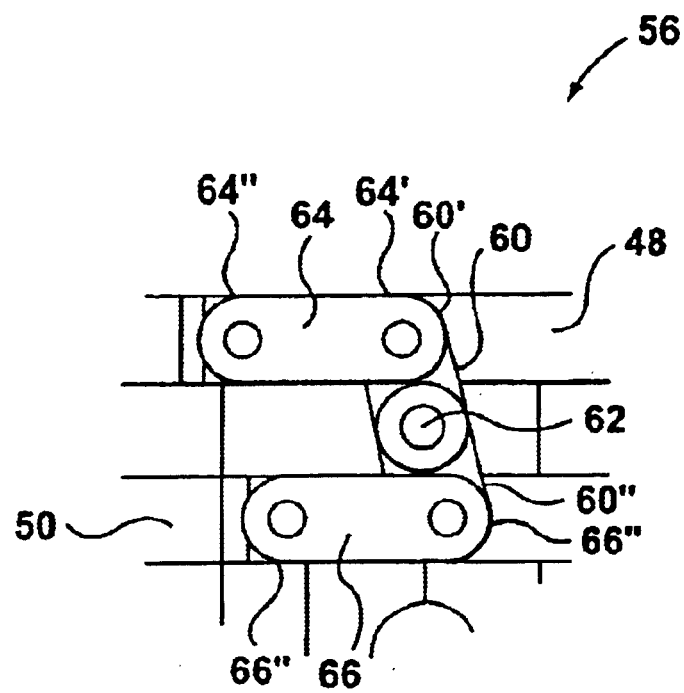
FIG. 3a is a schematic view of a first embodiment of the transmission means.
Figure 3B:
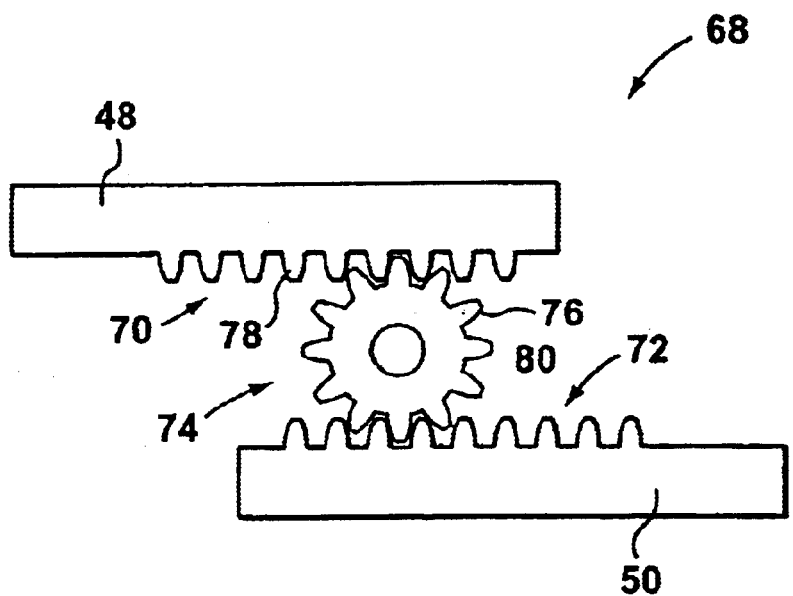
FIG. 3b is a schematic view of a second embodiment of the transmission means.

According to another embodiment, the lever assembly 56 could be replaced by a gearwheel mechanism 68 as shown in FIG. 3b. The first connecting bar 48 has a first toothed face 70, while the second connecting bar 50 has a second toothed face 72. A gearwheel 74 is arranged between the first connecting bar 48 and the second connecting bar 50 and has its teeth 76 engaging the teeth 78, 80 of the toothed faces 70, 72.

Figure 4:
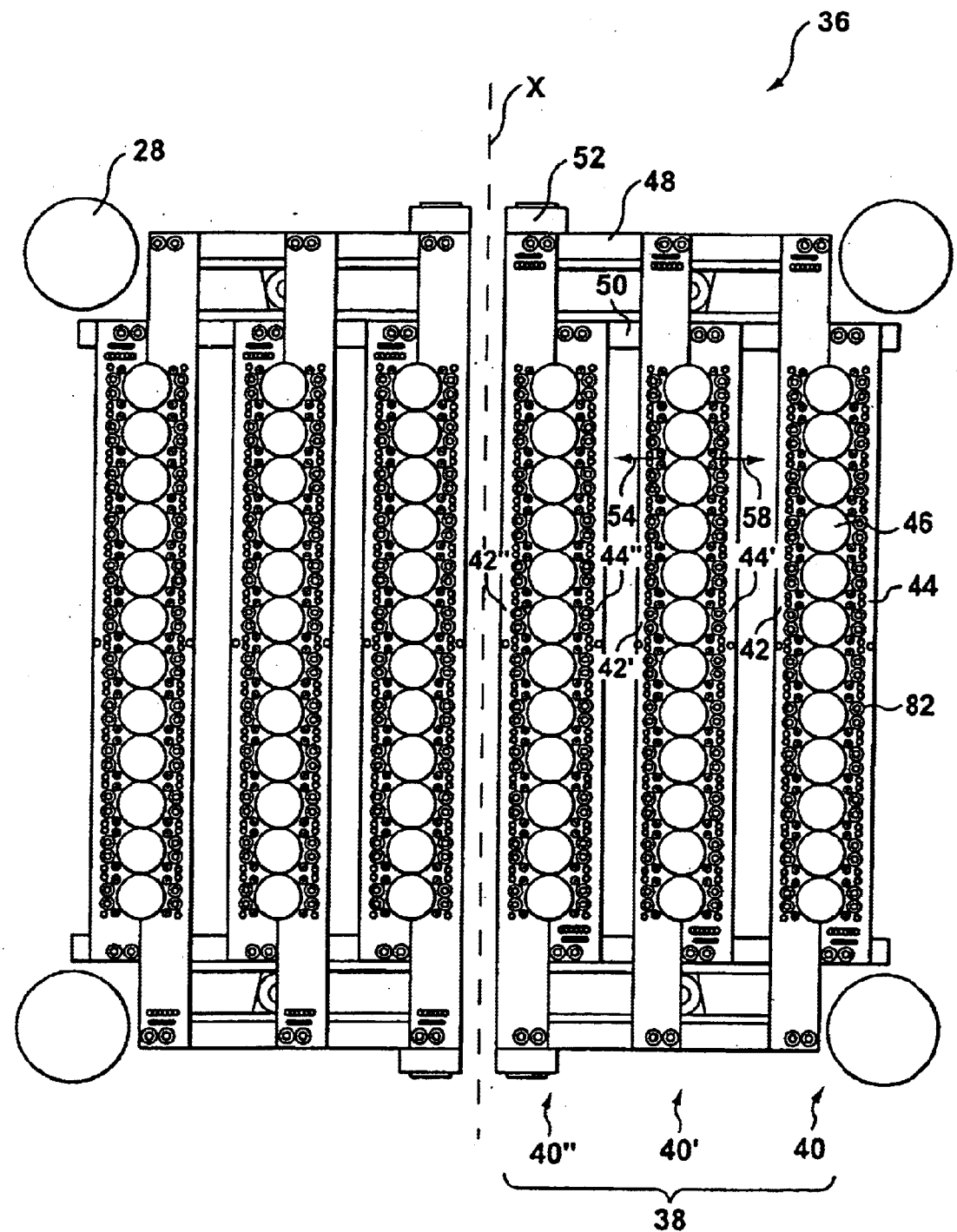
FIG. 4 is a schematic injection side view of the stripper assembly.

FIG. 4 shows the injection side 36" of the stripper assembly 36, i.e. the side facing the hot half 12 of the mold shoe 10. On the injection side 36" of the stripper assembly 36, the slides 42, 44; 42', 44'; 42", 44" comprise fixing means for fixing insert pairs (not shown) thereon. These fixing means are generally indicated by reference sign 82.

Figure 5:
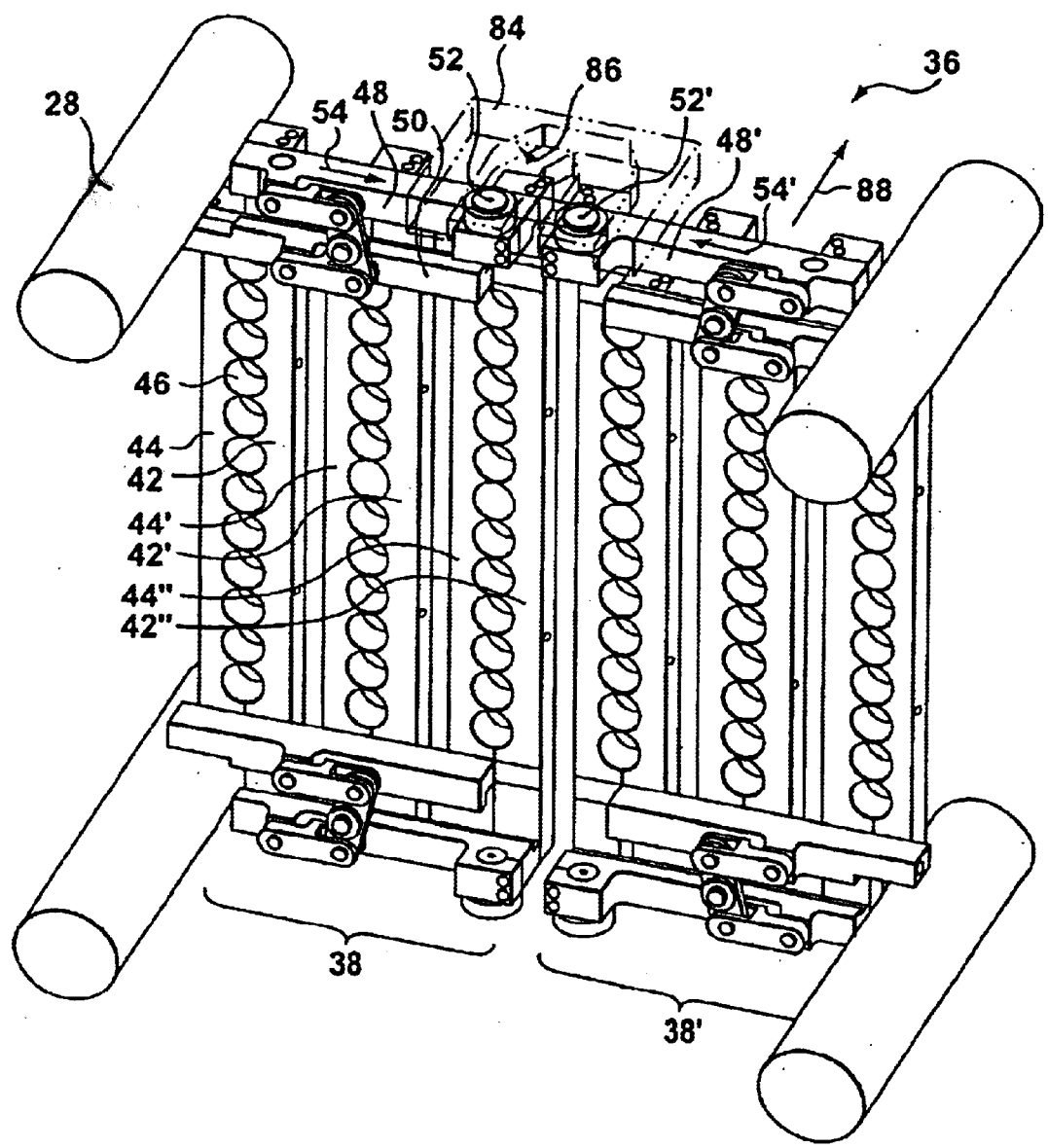
FIG. 5 is a perspective clamp side view of the stripper assembly.

Finally, FIG. 5 shows the clamp side 36' of the stripper assembly 36 in a perspective view. The cam 84 has a cam profile 86 in which the cam followers 52, 52' can move. As the stripper assembly 36 is actuated in the release direction (indicated by arrow 88), the first connection bar 48 of the first set 38 is operated in its first direction 54, whereas the first connection bar 48' of the second set 38' is operated in the opposite direction 54'.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A stripper assembly for a mold comprising:
   at least one first slide pair, and at least one parallel second slide pair symmetrically arranged about a centerline bisecting a mold face, each said slide pair having an outer slide and an inner slide;
   a first connecting bar connected to an inner slide of said first slide pair, a second connecting bar connected to an inner slide of said second slide pair, a third connecting bar connected to an outer slide of said first slide pair, a fourth connecting bar connected to an outer slide of said second slide pair, said first and second connecting bars moving in a direction towards said centerline when opening said slide pairs;
   an actuator operatively coupled to said first and second connecting bars to move (i) said first connecting bar connected to said inner slide of said first slide pair in a first direction, and (ii) said second connecting bar connected to said inner slide of said second slide pair in a second direction that is opposite of said first direction;
   a first transmission means operatively connected to said first connecting bar and said third connecting bar, for transferring movement of said first connecting bar to movement of said third connecting bar in said second direction; and
   a second transmission means connected to said second connecting bar and said fourth connecting bar for transferring movement of said second connecting bar to movement of said fourth connecting bar in said first direction.

2. Stripper assembly as claimed in claim 1, wherein said connecting bars are connected to said slides at first end portions thereof.

3. Stripper assembly as claimed in claim 2, wherein a further set of connecting bars is connected to said slides at second end portions thereof.

4. Stripper assembly as claimed in claim 1, wherein said first transmission means comprises:
   a first pivoting lever pivotably mounted between said first and third connecting bars, a first end of said first pivoting lever being coupled to said first connecting bar, and a second end of said first pivoting lever being coupled to said third connecting bar, and wherein said second transmission means comprises a second pivoting lever pivotably mounted between said second and said fourth connecting bars, a first end of said second pivoting lever being coupled to said second connecting bar, and a second end of said second pivoting lever being coupled to said fourth connecting bar.

5. Stripper assembly as claimed in claim 1, wherein said first transmission means comprises:

a first toothed face coupled to said first connecting bar;

a second toothed face coupled to said third connecting bar, said first and second toothed faces facing each other; and a first gearwheel engaging said first and second toothed faces, and wherein said second transmission means comprises:

a third toothed face coupled to said second connecting bar, a fourth toothed face coupled to said fourth connecting bar, said third and fourth toothed faces facing each other, and a second gearwheel engaging said third and fourth toothed faces.

6. Stripper assembly as claimed in claim 1, wherein said actuator comprises:

a first cam follower connected to said first connecting bar, and a second cam follower connected to said second connecting bar, a first cam in which said first cam follower is movable for moving said inner slide of said first slide pair in said first direction, and a second cam in which said second cam follower is movable for moving said inner slide of said second slide pair in said second direction.

7. Injection molding machine comprising a stripper assembly as claimed in claim 6.

8. A stripper assembly as defined in any one of claims 1, 4, 5 or 6 wherein said actuator is coupled to inner ends of said first and second connecting bars.

* * * * *